United States Patent [19]

Masuda et al.

[11] Patent Number: 5,335,274
[45] Date of Patent: Aug. 2, 1994

[54] EXTENDABLE TELEPHONE

[75] Inventors: Hitoshi Masuda; Masataka Suzuki; Masataka Ohno, all of Tokyo; Kazuyoshi Kobayashi; Hiromitsu Nakamura, both of Kanagawa, all of Japan

[73] Assignee: NEC Corporation, Japan

[21] Appl. No.: 843,460

[22] Filed: Feb. 28, 1992

[30] Foreign Application Priority Data

Feb. 28, 1991 [JP] Japan ................................ 057855

[51] Int. Cl.⁵ ............................................. H04M 1/00
[52] U.S. Cl. ................................... 379/433; 379/428
[58] Field of Search .............. 379/433, 431, 434, 436, 379/428, 435

[56] References Cited

U.S. PATENT DOCUMENTS

| | | | |
|---|---|---|---|
| 4,272,655 | 6/1981 | Mackenzie et al. | 379/433 |
| 4,821,318 | 4/1989 | Wu | 379/433 |
| 4,907,266 | 3/1990 | Chen | 379/433 |
| 5,003,589 | 3/1991 | Chen | 379/433 |
| 5,054,051 | 10/1991 | Hoff | 379/433 |

FOREIGN PATENT DOCUMENTS 60-21636  2/1985  Japan ................................ 379/433

Primary Examiner—James L. Dwyer
Assistant Examiner—Jack Chiang
Attorney, Agent, or Firm—Ostrolenk, Faber, Gerb & Soffen

[57] ABSTRACT

An improved extendible telephone having a main casing incorporating a receiver and an auxiliary casing incorporating a transmitter and dial keys and slidably mounted on the main casing. Guide grooves are formed in each of the slide surface of the main casing and a back plate which is fastened to the auxiliary casing. Rail members are fitted in the slide surface of the main casing. The auxiliary casing is slidable along the rail members toward and away from an extended position while being guided by the guide grooves. The rail members each has an angled lug while the back plate is formed with two spaced pairs of angled recesses. When the auxiliary casing is slid to the extended position or a contracted position, the angled lugs selectively mate with either of the two pairs of angled recesses to lock the auxiliary casing in position.

13 Claims, 9 Drawing Sheets

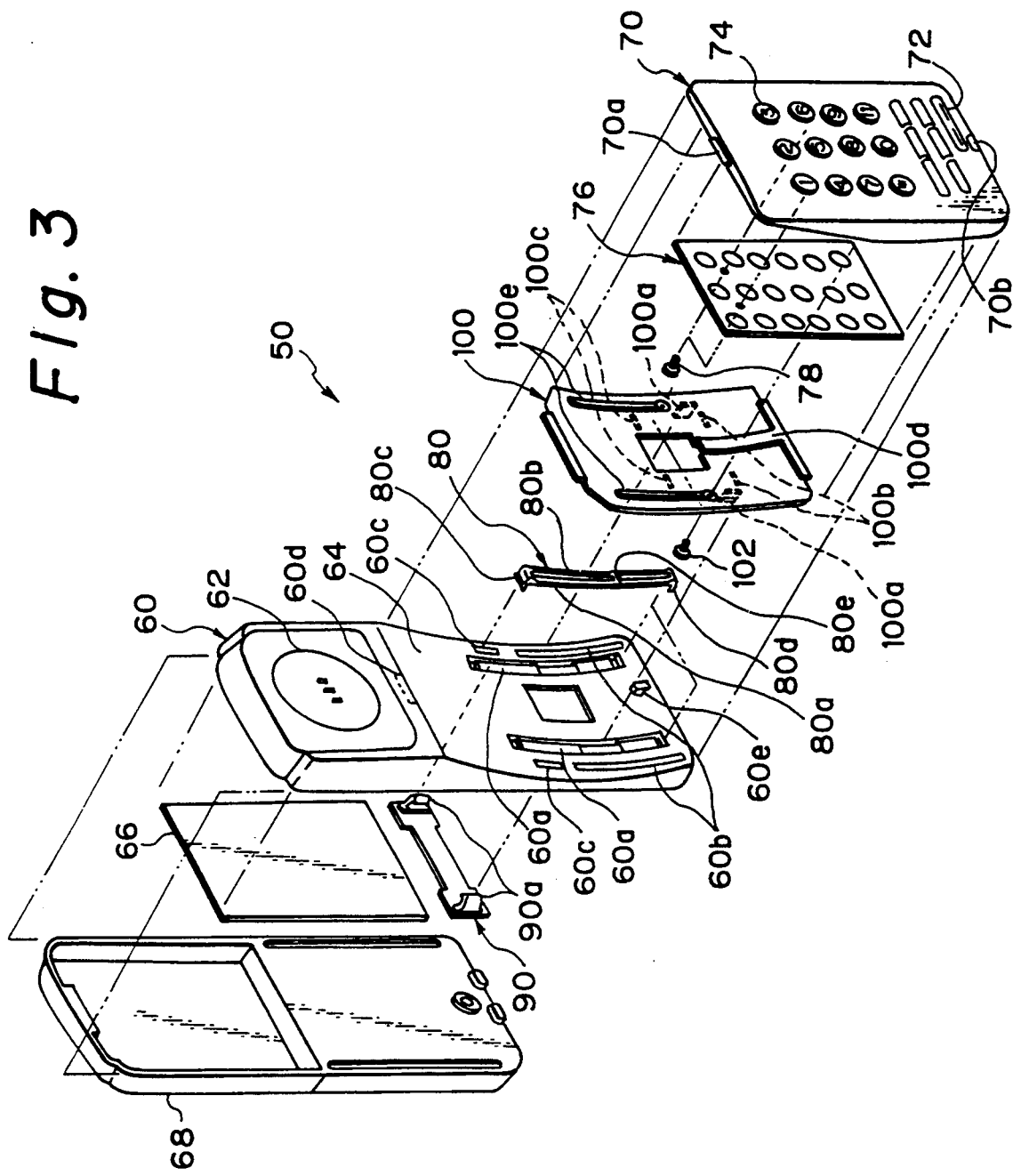

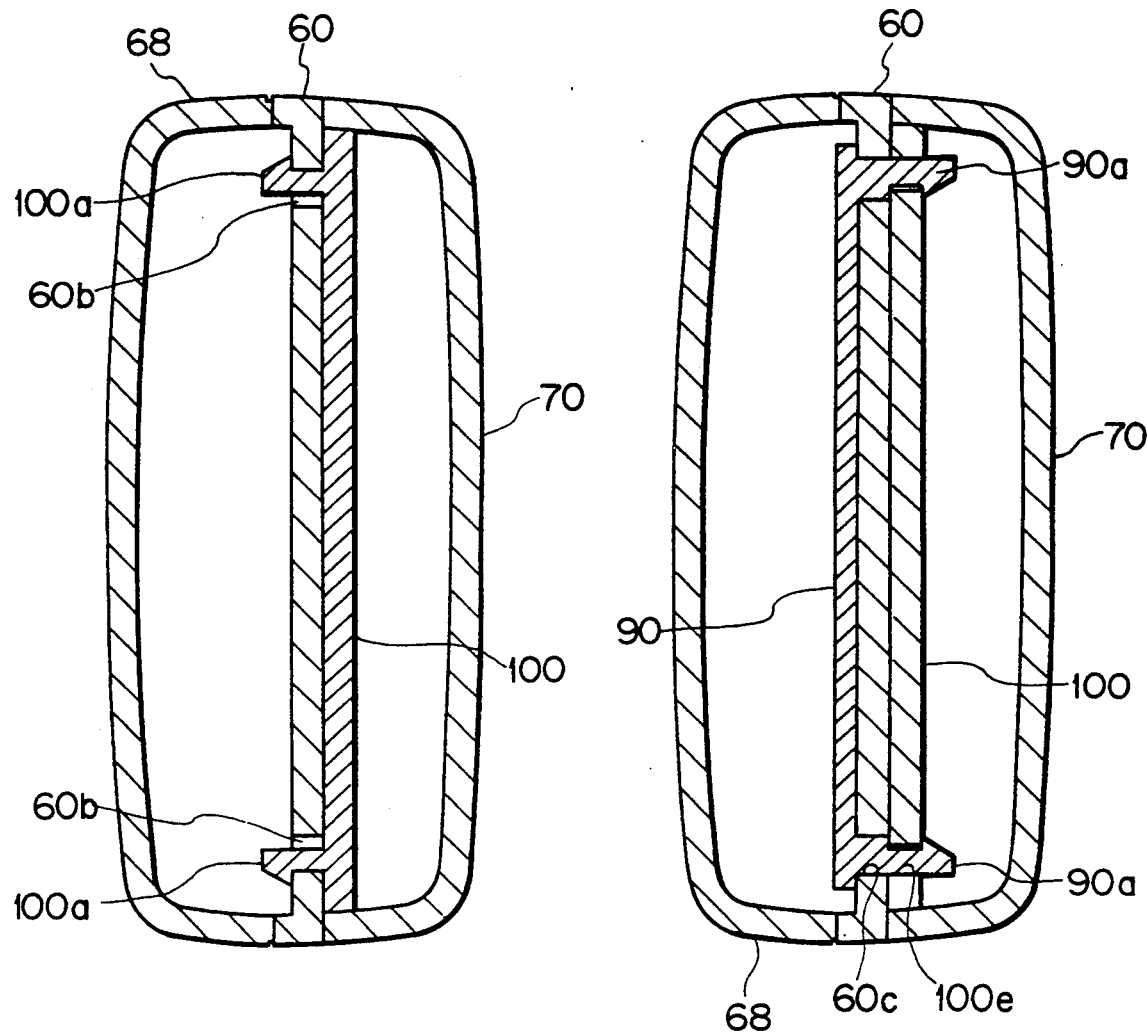

Fig. 5A
Fig. 5B
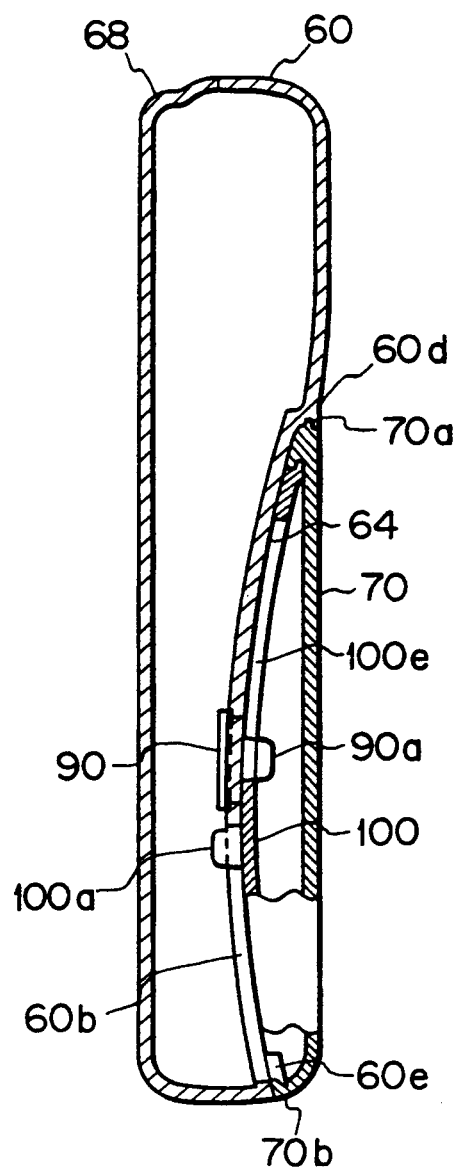
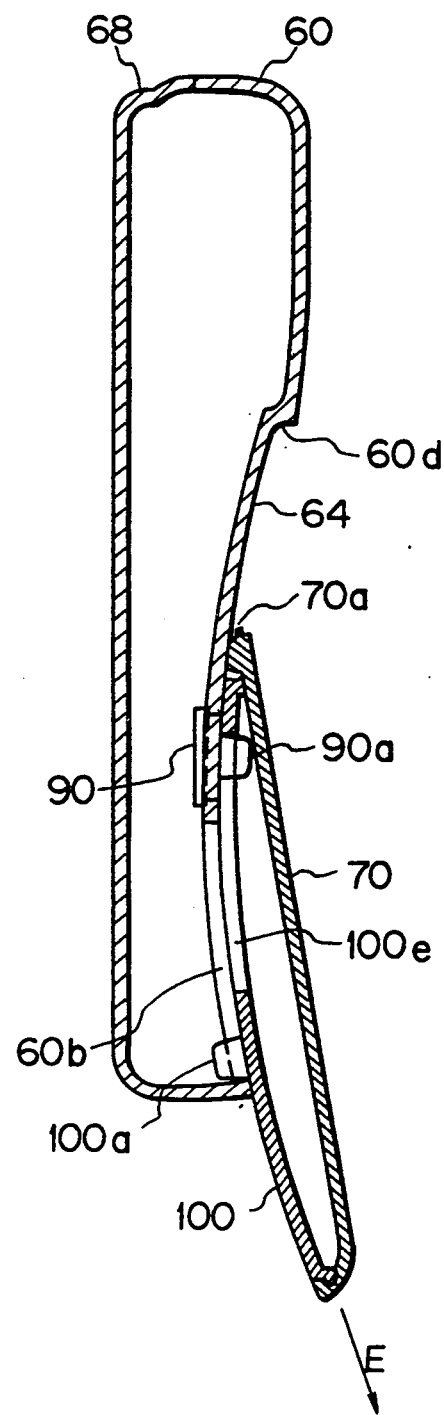

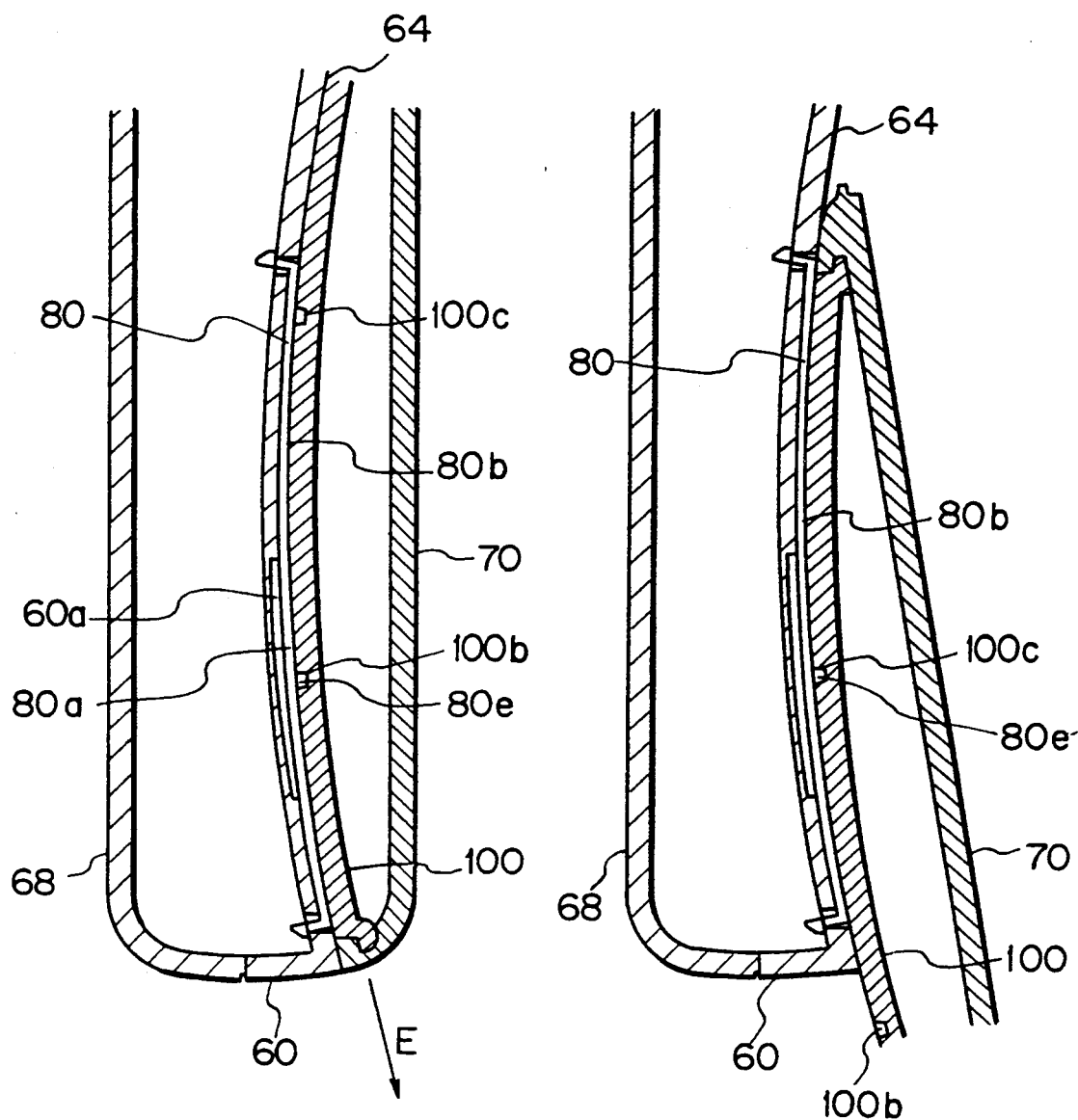

EXTENDABLE TELEPHONE

BACKGROUND OF THE INVENTION

The present invention relates to an improved extendible telephone having a body casing or main casing incorporating a receiver and an operation casing or auxiliary casing incorporating a transmitter and dial keys.

Various kinds of telephones extensively used today include a radio telephone to be used while in movement and a cordless telephone to be used only in a relatively narrow range, e.g., in an office or a home. A portable radio telephone, for example, should preferably be small size and light weight since it is carried by the user. It is a common practice with this kind of telephone to connect an auxiliary casing having a transmitter foldably or openably to a main casing having a receiver and dial keys by a hinge mechanism. To use the telephone, the user unfolds or opens the auxiliary casing away from the main casing to a position where a desired angle for conversation is set up and the receiver and transmitter are spaced apart by a desired distance. While the telephone is not used, it is put in, for example, the user's pocket with the auxiliary casing folded or closed. Such a foldable telephone is disclosed in, for example, U.S. Pat. No. 4,897,873 (Beutler et al) and Japanese Patent Laid-Open Publication (Kokai) Nos. 212052/1989 and 159159/1990. The conventional foldable telephone, however, has a drawback that the hinge mechanism is exposed to the outside of the main and auxiliary casings since it cannot be readily incorporated in the main casing or the auxiliary casing, limiting the design freedom. In addition, the hinge mechanism is relatively bulky since it has to have a sufficient mechanical strength, obstructing the decrease in the size and weight of the telephone while degrading portability. Moreover, wirings between the main and auxiliary casings should be set up by way of the hinge mechanism and are, therefore, troublesome to in turn complicate the assembly of the telephone.

An extendible telephone, as distinguished from a foldable telephone, is also conventional. In an extendible telephone, an auxiliary casing having a transmitter and dial keys is slidably mounted on a main casing having a receiver by a guide mechanism. To use this kind of telephone, the auxiliary casing is slid via the guide mechanism to an extended position where the receiver and the transmitter are spaced apart by a desired distance. While the telephone is not used, the auxiliary casing is contracted to a position suitable for the telephone to be put in, for example, the user's pocket. However, since the extendible telephone has the guide mechanism having guides and guide channels thereof exposed to the outside of the main and auxiliary casing, not only the appearance is degraded, but also the design freedom is limited. The guide mechanism causes the guides and guide channels to slide on each other during extension and contraction, causing the main and auxiliary casings to wear. It follows that at least the contacting portions of the telephone, i.e., the main and auxiliary casings have to be made of a material which are high slidable and resistive to wear, increasing the cost of the telephone. Furthermore, replacing the main and auxiliary casings and due to wear is troublesome and further increases the cost of the the telephone.

SUMMARY OF THE INVENTION

It is, therefore, an object of the present invention to provide an extendible telephone which is small size, light weight and highly portable.

It is another object of the present invention to provide an extendible telephone which enhances design freedom without degrading the appearance.

It is another object of the present invention to provide an extendible telephone which promotes easy assembly and reduces the production cost.

In accordance with the present invention, an extendible telephone having a main casing provided at least with a receiver and a slide surface, and an auxiliary casing provided at least with a transmitter and mounted on the main casing to be extendible from the main casing in a sliding motion comprises a back plate member fastened to the back of the auxiliary casing which faces the slide surface of the main casing, slide members intervening between the slide surface of the main casing and the back plate member for allowing the auxiliary casing to slide relative to the main casing to either of an extended position and a contracted position, and a support member for connecting the back plate member slidably to the slide surface of the main casing via the slide members.

Also, in accordance with the present invention, an extendible telephone having a main casing provided at least with a receiver, and an auxiliary casing provided at least with a transmitter and mounted on the main casing to be extendible from the main casing in a sliding motion comprises a curved slide surface along which the auxiliary casing is slidable relative to the main casing, and a connecting member for connecting the auxiliary casing slidably to the main casing via the slide surface.

BRIEF DESCRIPTION OF THE DRAWINGS

The above and other objects, features and advantages of the present invention will become more apparent from the following detailed description taken with the accompanying drawings in which:

FIG. 3 is an exploded perspective view of an extendible telephone embodying the present invention;

FIGS. 4A and 4B are sections showing a main casing and an auxiliary casing included in the embodiment in a connected position;

FIGS. 5A, 5B, 6A, 6B, 7A and 7B show how the telephone of FIG. 3 slide; and

DESCRIPTION OF THE PREFERRED EMBODIMENT

Figure 1A:
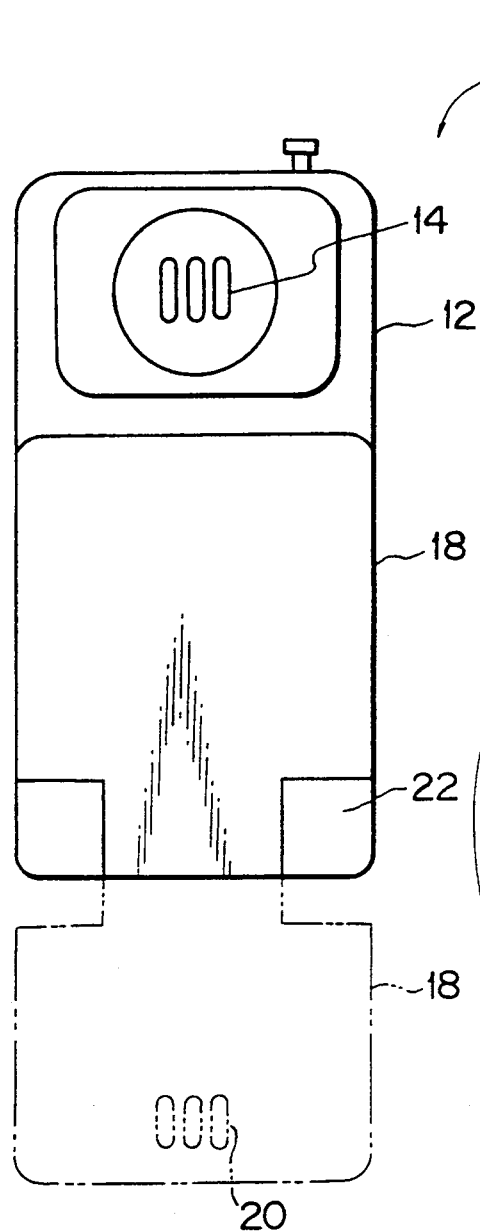
FIG. 1A is a plan view showing a conventional foldable telephone.
Figure 1B:
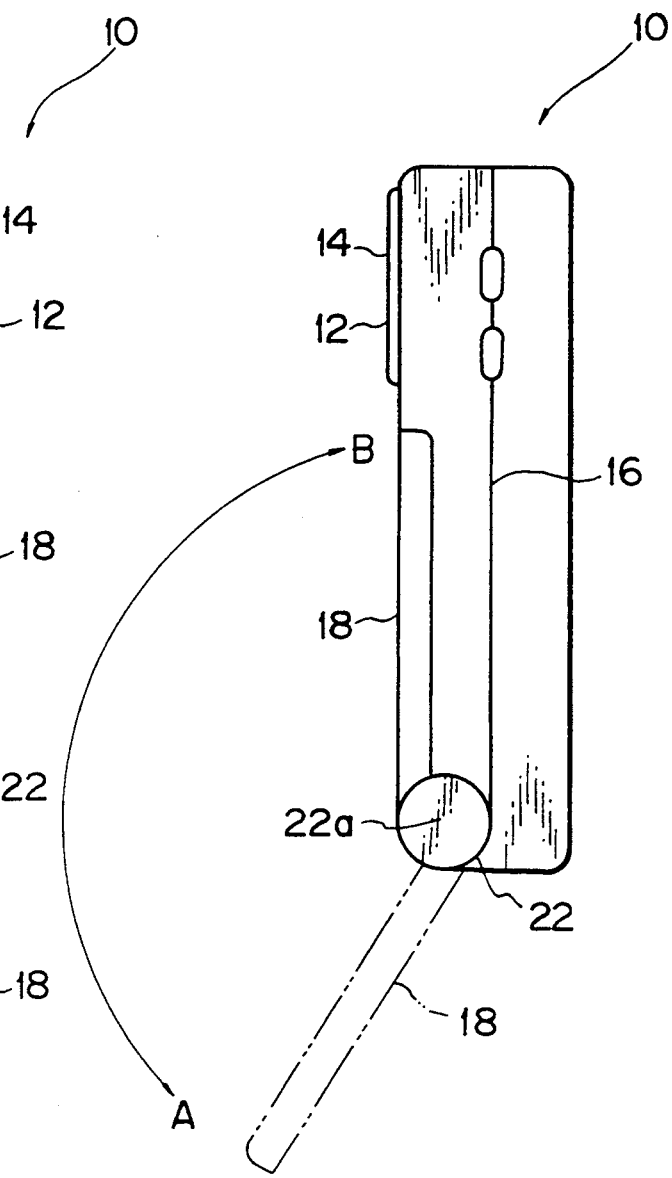
FIG. 1B is a side elevation of the telephone shown in FIG. 1A.

To better understand the present invention, a brief reference will be made to a conventional foldable telephone, shown in FIGS. 1A and 1B. As shown, the foldable telephone, generally 10, has a main casing 12, an auxiliary casing 18, and a hinge mechanism 22 including a shaft 22a on which the auxiliary casing 18 is mounted to be rotatable toward and away from the main casing 12. The main casing 12 is provided with a receiver 14 and dial keys 16 while the auxiliary casing 18 is provided with a transmitter 20. To use the telephone 10, the user rotates or unfolds the auxiliary casing 18 about the shaft 22a in a direction indicated by an arrow A in FIG. 1B. The auxiliary casing 18 is locked on reaching a position indicated by a phantom line in FIGS. 1A and 1B, i.e., a position where a desired angle for conversation is provided between the main and auxiliary casings 12 and 18 and a desired distance is provided between the receiver 14 and the transmitter 20. After the conversation, the user folds the auxiliary casing 18 in a direction B to a position indicated by a solid line in the figures and may put the telephone 10 in, for example, a pocket. The problem with the foldable telephone 10 is that the hinge mechanism 22 is exposed to the outside of the main and auxiliary casings 12 and 18 for structural reasons, limiting the design freedom, as discussed earlier. In addition, the hinge mechanism 22 is bulky since it has to have a mechanical strength great enough to withstand the opening and closing motion of the auxiliary casing 18, obstructing the decrease in the size and weight, of the telephone 10 while degrading portability. Moreover, wirings between the main and auxiliary casings 18 should be set up by way of the hinge mechanism 22 and are, therefore, troublesome to in turn complicate the assembly of the telephone 10.

Figure 2A:
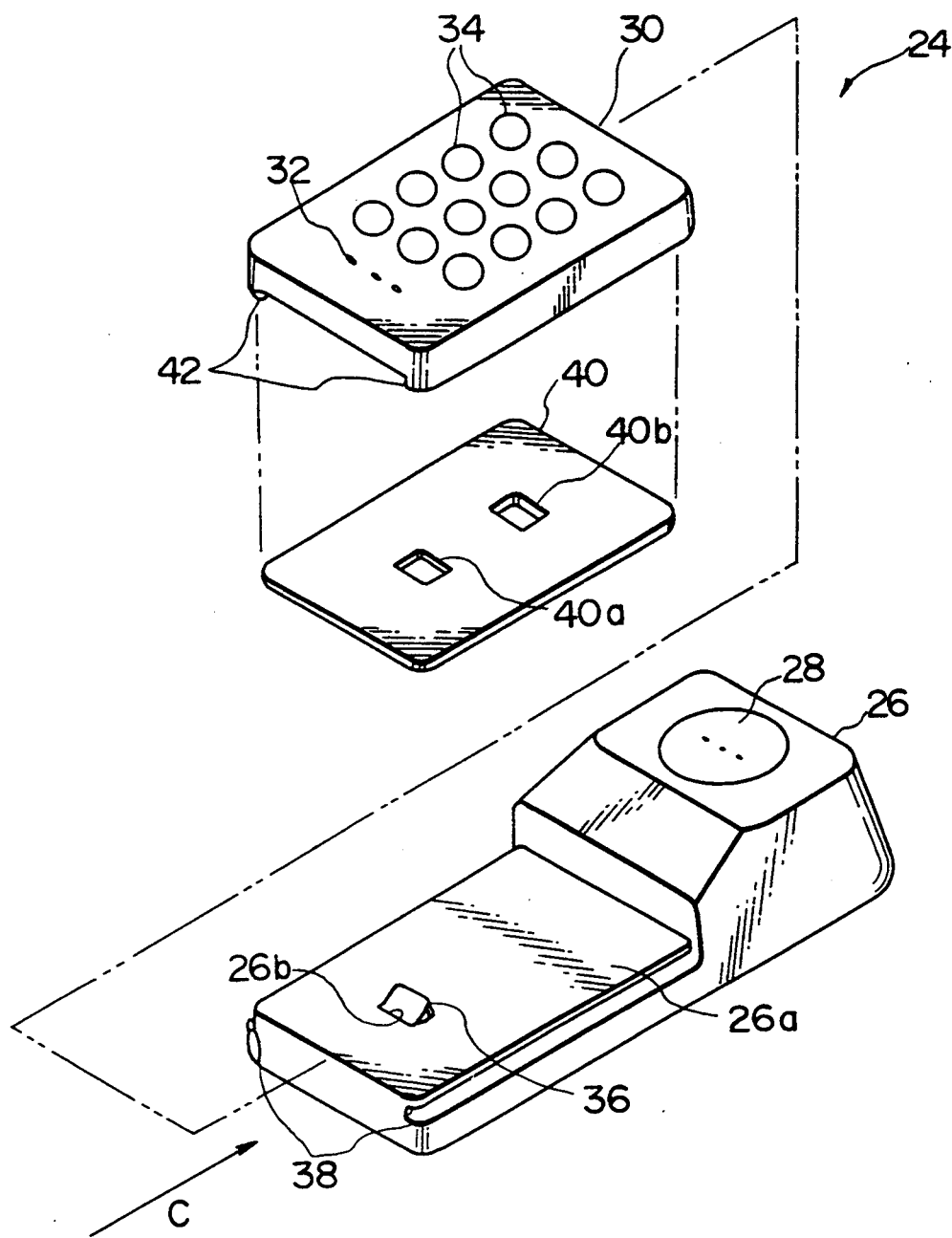
FIG. 2A is an exploded perspective view of a conventional extendible telephone.
Figure 2B:
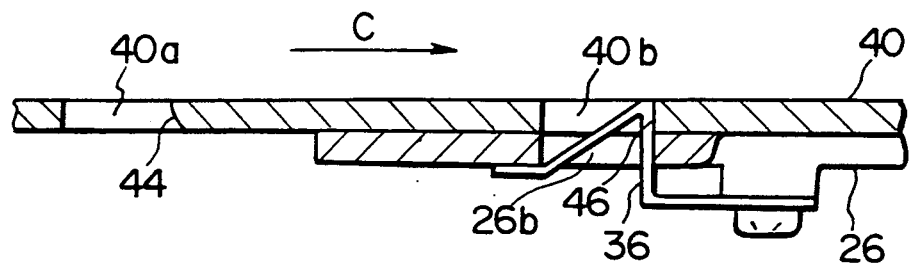
FIGS. 2B and 2C show how the telephone of FIG. 2A is extendible.

FIGS. 2A and 2B show a conventional extendible telephone, generally 24. As shown, the extendible telephone 24 has a main casing 26 including a receiver 28. An auxiliary casing 30 is slidably mounted on the main casing 26, i.e., extendible from the main casing 26 and includes a transmitter 32 and dial keys 34. A rectangular hole 26b is formed through the main casing 26. A stop 36 is formed by bending a leaf spring and received in the hole 26b while partly protruding from the surface 26a of the main casing 26 on which the auxiliary casing 30 is slidable. Guide channels 38 are formed on laterally opposite ends of the main casing 26. A back plate 40 is affixed to the back of the auxiliary casing 30 and formed with two positioning holes 40a and 40b which are spaced apart by a predetermined distance in the longitudinal direction of the plate 40. Guides 42 are formed on the inner periphery of opposite side walls of the auxiliary casing 30, and each has a generally L-shaped cross-section. The guides 42 of the auxiliary casing 30 mate with the guide channels 38 of the main casing 26.

Figure 2C:
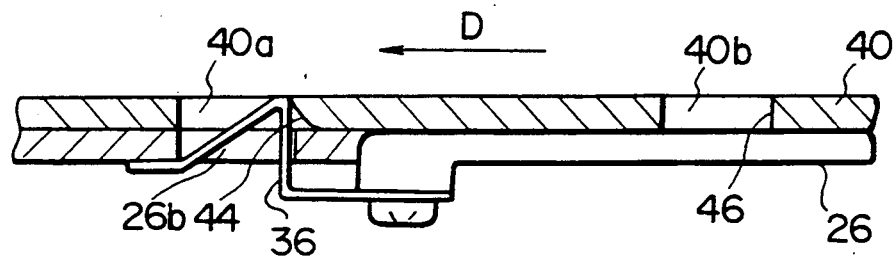

As shown in FIG. 2B, the auxiliary casing 30 is mounted on the main casing 26 by having the guides 42 thereof mated with the guide channels 38 and then being slid in a direction C until the postioning hole 40b mates with the stop 36. Specifically, in the position shown in FIG. 2B, the auxiliary casing 30 with the back plate 40 is extended from the main casing 26, so that the telephone 24 may be used. As shown in FIG. 2C, when the auxiliary casing 30 is further slid in the direction C on the main casing 26 until the other positioning hole 40a mates with the stop 36, the casing 30 fully lies on the sliding surface 26a of the casing 26. In such a contracted position, the telephone 24 may be put in, for example, the user's pocket. As shown in FIG. 2C, the edge of the positioning hole 40a abutting against the stop 36 is arcuate. Hence, when a force is exerted on the auxiliary casing 30 in a direction D, FIG. 2C, the casing 30 moves in the direction D while pressing the stop 36 downward along the arcuate edge 44 thereof. As a result, the auxiliary casing 30 is movable in the direction D to the previously stated position of FIG. 2B. Once the positioning hole 40b and stop 36 mate with each other, they will not be released though the force may be further exerted in the direction D, since the edge 46 of the hole 40b abutting against the stop such a position is straight. When the auxiliary casing 30 slides on the main casing 26 during extension or contraction, a pressure acts between the back plate 40 and the slide surface 26a of the casing 26. This is successful in exerting an adequate degree of resistance to the auxiliary casing 30 being moved by the user and in eliminating shaking.

However, since the guide channels 38 and guides 42 of the telephone 24 are exposed to the outside, they not only degrade the appearance of the telephone 24 but also limit the design freedom. The guide channels 38 and guides 42 slide on each other during extension and contraction, causing the main and auxiliary casings 26 and 30 to wear. It follows that the casings 26 and 30 have to be made of a material which is highly slidable and resistive to wear, increasing the cost of the telephone 24. Furthermore, replacing the main and auxiliary casings 26 and 30 due to wear is troublesome and further increases the cost.

Referring to FIG. 3, an extendible telephone embodying the present invention is shown and generally designated by the reference numeral 50. As shown, the telephone 50 includes a main casing 60 having a receiver 62 and a slide surface 64. An auxiliary casing 70 has a transmitter 72 and dial keys 74. A pair of rail members 80 are affixed to the slide surface 64 of the main casing 60. A hook member 90 is affixed to the back of the main casing 60 while a back plate 100 is affixed to the back of the auxiliary casing 70. A printed circuit board 66 and a rear cover 68 are also affixed to the back of the main casing 60, and another printed circuit board 76 is affixed to the back of the auxiliary casing 70.

A pair of grooves 60a are formed in the slide surface 64 of the main casing 60 in close proximity to opposite edges of the casing 60 and in symmetrical positions in the lateral direction. The grooves 60a have such a length that they will not be exposed to the outside when the auxiliary casing 70 is extended from the main casing 60 to a position where the telephone 50 is usable. Each groove 60a is deeper at an intermediate portion than at opposite end portions with respect to the longitudinal direction, i.e., in the extendible direction of the telephone 50. A pair of guide slots 60b extend in parallel to the grooves 60a and are located closer to opposite edges of the slide surface 64 than the grooves 60a. The guide slots 60b have a length corresponding to a distance over which the auxiliary casing 70 is movable relative to the main casing 60. A pair of rectangular holes 60c are each positioned above and in alignment with respective one of the guide slots 60b. Further, the main casing 60 is provided with a hole 60d and a pawl 60e at, respectively, the upper edge and the lower edge of the slide surface 64. On the other hand, the auxiliary casing 60 has a lug 70a at the upper edge thereof which mates with the hole 50d and a hole 70b at the lower edge which mates with the pawl 60e.

The rail members 80 have a configuration complementary to the configuration of the grooves 60a of the main casing 60, and each is made up of a flat portion 80a and a bulged portion 80b extending in the longitudinal direction of the flat portion 80a. Further, each rail member 80 has pawls 80c and 80d at opposite ends thereof, and an angled lug 80e located substantially at the center of the bulged portion 80b. A pair of pawls 90a extend from opposite ends of the hook member 90 and extend throughout the pair of rectangular holes 60c of the main casing 150. On the surface facing the slide surface 64 of the main casing 60, the back plate 100 has a pair of pawls 100a to be slidably received in the guide slots 60b of the main casing 60, two spaced pairs of angled recesses 100b and 100c selectively engageable with the angled lugs 80e of the rail members 80, and an elongate recess or guide 100d for receiving the lug 60e of the main casing 60 while the casing 70 slides relative to the casing 60. Further, the back plate 100 has a pair of guide grooves 100e for allowing the pawls 90a of the hooks 90 to slide therein.

To assemble the telephone 50, the printed circuit board 76 is fastened to the auxiliary casing 70 by screws 78, and then the back plate 100 is fastened to the same by screws 102 over the circuit board 76 to form an auxiliary casing subassembly. After the rail members 80 have been fitted in the grooves 60a of the main casing 60, the pawls 100a of the back plate 100 included in the subassembly are press-filtted in the guide slots 60b. Subsequently, the pawls 90a of the hook member 90 are press-fitted in the guide grooves 100e of the back plate 100 via the rectangular holes 60c and from the rear of the main casing 60. As a result, the auxiliary casing 70 is connected to the main casing 60 and slidable on the slide surface 64 of the latter. Finally, the printed circuit board 66 is affixed to the back of the main casing 60, and then the rear cover 68 is affixed to the casing 60 over the circuit board 56. FIG. 4A shows the connection of the main casing 60 and the back plate 100 of the auxiliary casing 70, while FIG. 4B shows the connection of the main casing 60 and the back plate 100 and hook member 90.

A reference will be made to FIGS. 5A and 5B for describing the extension and contraction of the auxiliary casing 70 relative to the main casing 60. As shown in FIG. 5A, in the contracted position, the auxiliary casing 70 has the lug 70a thereof received in the hole 60d of the main casing 60 and, in turn, receives the pawl 60e of of the latter in the hole 70b thereof. In this condition, the casing 70 is firmly retained by the casing 60. As a force is exerted on the casing 70 in a direction E, FIG. 5B, the casing 70 slides along the bulged portions 80b of the rail members 80 which are fitted in the casing 60. At this instant, the pawls 100a of the back plate 100 and the pawls 90a of the hook member 90 are guided respectively by the guide slots 60b of the casing 60 and the guide grooves 100e of he back plate 100. As a result, the casing 70 is fully extended out from the casing 60, as shown in FIG. 5B.

Figures 6A, 6B:
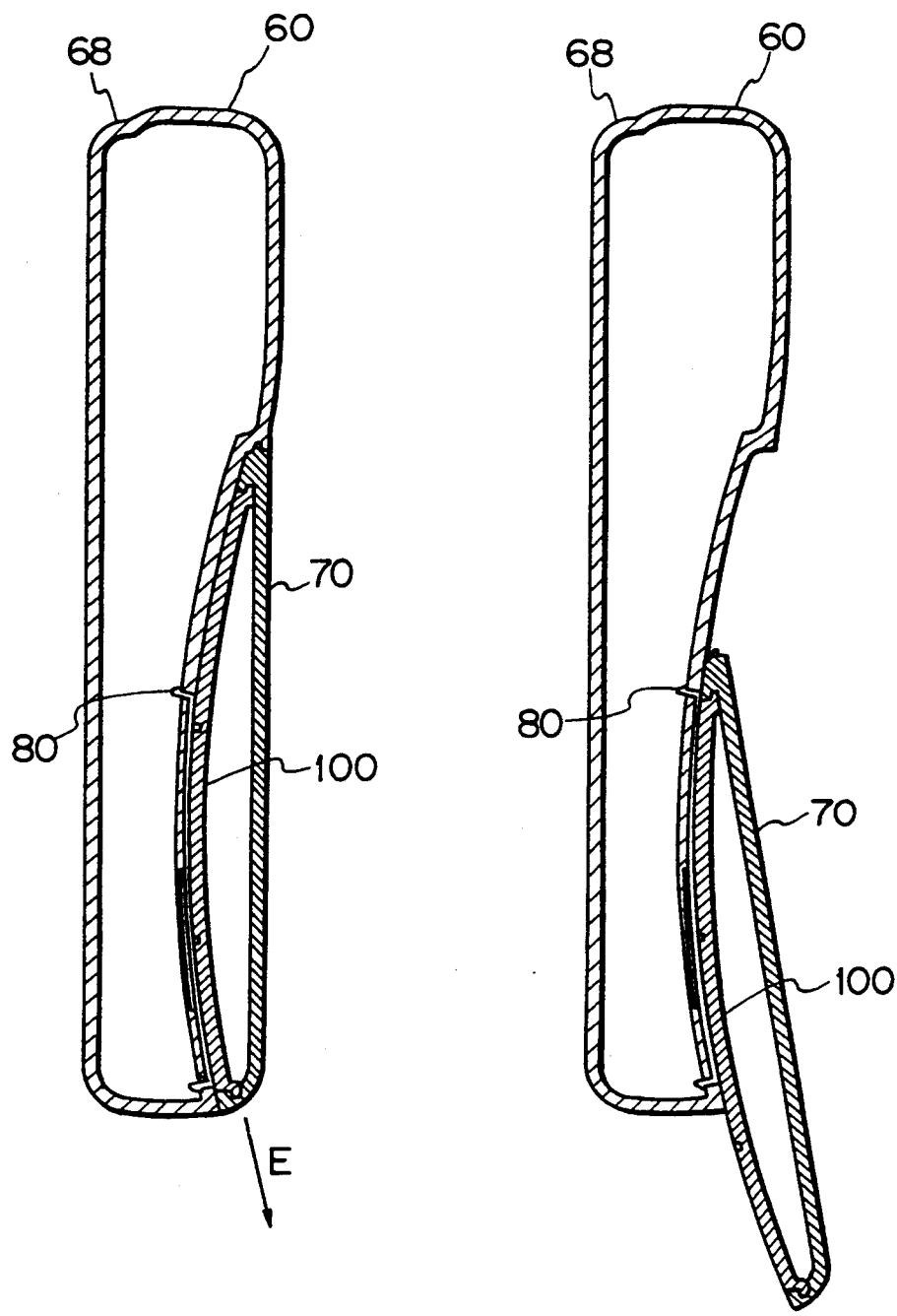

How the rail members 80 move will be described with reference to FIGS. 6A, 6B, 7A and 7B. FIG. 6A shows the auxiliary casing 70 in the contracted position while FIG. 6B shows it in the extended position. FIGS. 7A and 7B are fragmentary enlarged views associated with FIGS. 6A and 6B, respectively. As best shown in FIG. 7A, in the contracted position, the angled lug 80e of each rail member 80 is fully received in the associated lower angled recess 100b of the back plate 100, locking the rail member 80 in position. As the casing 70 is pulled in the direction E by a force exceeding predetermined one, the lug 80e is released from the recess 100b and pressed by the back plate 100. As a result, part of the flat portion 80e of the back plate 100 where the lug 80e is position is deformed to penetrate into the deeper portion of the associated groove 60a of the casing 60. When the casing 70 is further pulled to the fully extended position shown in FIG. 7B, the lug 80e of the rail member 80 is fully received in the upper recess 100c of the back plate 100, again locking the rail member 80 in position. The telephone 50 is ready to operate in such an extended position.

In the illustrative embodiment, the rail members 80, hook member 90 and back plate 100 which allow the auxiliary casing 70 to slide on the main casing 60 are preferably made of resin or similar material having high wear resistance and slidableness.

Figure 8:
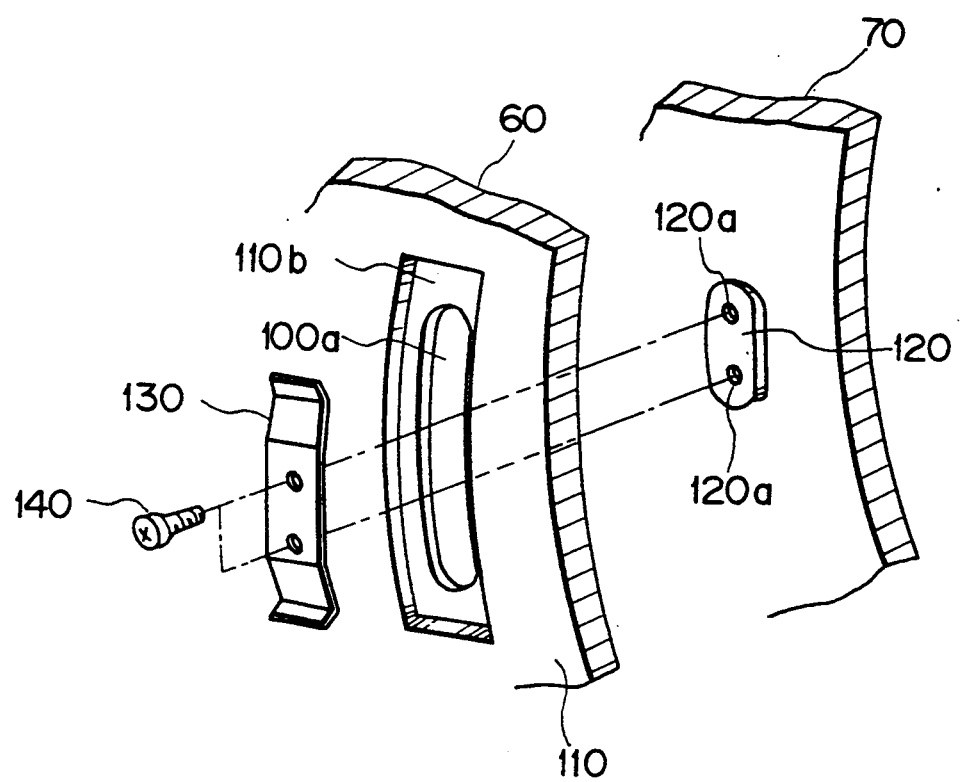
FIG. 8 is a fragmentary perspective view of a modified form of the embodiment.

FIG. 8 shows a modified form of the extendible telephone 50. As shown, this embodiment does not have the rail members 80, hook member 90 or back plate 100 and, instead, provides the main casing 60 with a pair of parallel wall portions 110 in close proximity to opposite edges of the slide surface 64 thereof. FIG. 8 shows only one of the wall portions 110 which adjoins the right side edge as viewed in FIG. 3. As shown, an elongate slot 110a is formed through the wall portion 110 and surrounded by a seat portion, or stepped portion, 110b. Projections 120 (only one is shown) are provided on the inner surface of the auxiliary casing 70 in alignment with the wall portions 110, and each mates with one of the slots 110a when the telephone 50 is assembled. Threaded holes 120a are formed in each projection 120. A leaf spring 130 is fastened to each projection 120 by screws 140 which are driven into the threaded holes 120a, while resting on the seat portion 110b. Since the leaf spring 130 is angled, it tends to pull the projection 120, i.e., the casing 70 toward the casing 60 when fastened to the projection 120. Therefore, the casing 70 constantly biased by the leaf spring 130 does not slide relative to the casing 60 while it is free from external forces. When the user pulls or presses the casing 70, the casing 70 is ready to slide on the casing 60. The slot 110a functions to delimit the slidable range of the casing 70. Hence, the length of the slot 110a is selected such that the casing 70 fully lies on the slide surface 64 of the casing 60 when the projection 120 abuts against one end of the slot 110a or fully extends from the casing 60 when the former abuts against the other end of the latter.

If desired, the casings 60 and 70 may be provided with the projections 120 and the slots 110a, respectively, contrary the above modification.

In summary, it will be seen that the present invention provides an extendible telephone which is small size, light weight and highly portable, enhances the design freedom while achieving attractive appearance, simplifies the assembly, and reduces the cost.

Various modifications will become possible for those skilled in the art after receiving the teachings of the present disclosure without departing from the scope thereof.

What is claimed is:

1. An extendible telephone set including:
   a main casing means provided at least with a receiver and a curved concave surface;
   an auxiliary casing means provided at least with a transmitter and mounted on said main casing means to be extendible therefrom in a curvilinear sliding motion;
   said auxiliary casing means including a curved convex back which faces said concave surface of said main casing means;
   first means operatively mounting said auxiliary casing means to said main casing means for sliding curvilinear movement relative thereto between a contracted position and an extended position;

with said auxiliary casing means in said contracted position, said auxiliary casing means overlying said concave surface and being nested in a depression defined by said concave surface;

with said auxiliary casing means in said contracted position, said telephone set having a generally rectangular parallelepiped outline;

said first means comprising slide members intervening between said concave surface of said main casing means and said convex back for allowing said auxiliary casing means to slide curvilinearly relative to said main casing means to either of said extended position and said contracted position, and a support member for connecting said convex back slidably to said concave surface of said main casing means via said slide members; and said first means also comprising a pair of grooves extending in a longitudinal direction on said concave surface of said main casing means in close proximity to opposite side edges of said concave surface and symmetrically to each other, a pair of guide slots formed through said main casing means in parallel to said pair of grooves and closer to said opposite side edges than said grooves, and a pair of rectangular holes located above and in alignment with said pair of guide slots.

2. A telephone set as claimed in claim 1, wherein said slide members have a configuration complementary to the configuration of said pair of grooves, and each of said slide members comprises a flat portion, a bulged portion extending in the longitudinal direction of said flat portion, an angled lug located intermediate opposite ends of said bulged portion, and a pair pawls located at opposite ends of said slide member.

3. A telephone set as claimed in claim 2, wherein said support member comprises an elongate hook having at opposite ends thereof a pair of pawls which extend throughout said pair of rectangular holes of said main casing means.

4. A telephone set as claimed in claim 3, wherein said auxiliary casing means further comprising a pair of pawls provided on the convex back facing said concave surface of said main casing means and mating with and sliding in said pair of guide slots of said main casing means; said auxiliary casing means further comprising a first and a second pair of recesses spaced apart from each other by a predetermined distance and selectively engageable with said pair of angled lugs of said slide members, and a pair of guide grooves located closer to opposite side edges of said convex back than said first and second pairs of recesses for slidably receiving said pair of pawls of said hook.

5. A telephone set as claimed in claim 4, further comprising a pawl formed at the lower edge of said slide surface of said main casing means.

6. A telephone set as claimed in claim 5, wherein said convex back is provided with an elongated guide recess for allowing said pawl of said main casing means to slide therein when said auxiliary casing means slides between said extended and said contracted positions.

7. A telephone set as claimed in claim 1, wherein said convex back, said slide members and said support member are made of resin which are highly sliable and resistive to wear.

8. An extendible telephone having a main casing provided at least with a receiver and a slide surface, and an auxiliary casing provided at least with a transmitter and a back surface, said auxiliary casing being mounted on said main casing to be extendible from said main casing in a sliding motion, said telephone comprising:

a back surface plate member fastened to the back of said auxiliary casing which faces said slide surface of said main casing;

slide members intervening between said slide surface of said main casing and said back plate member for allowing said auxiliary casing to slide relative to said main casing to either of an extended position and a contracted position;

a support member for connecting said back plate member slidably to said slide surface of said main casing via said slide members;

a pair of grooves extending in a longitudinal direction on said slide surface of said main casing in close proximity to opposite side edges of said slide surface and symmetrically to each other;

a pair of guide slots formed through said main casing in parallel to said pair of grooves and closer to said opposite side edges than said grooves; and a pair of rectangular holes located above and in alignment with said pair of guide slots.

9. A telephone as claimed in claim 8, wherein said slide members have a configuration complementary to the configuration of said pair of grooves, and each of said slide members comprises a flat portion, a bulged portion extending in the longitudinal direction of said flat portion, an angled lug located at the intermediate between opposite ends of said bulged portion, and a pair of pawls located at opposite ends of said slide member.

10. A telephone as claimed in claim 9, wherein said support member comprises and elongated hook having at opposite ends thereof a pair of pawls which extend throughout said pair of rectangular holes of said main casing.

11. A telephone as claimed in claim 10, wherein said back plate member comprises a pair of pawls provided on the back facing said slide surface of said main casing and mating with and sliding in said pair of guide slots of said main casing, a first and a second pair of recesses spaced apart from each other by a predetermined distance and selectively engageable with said pair of angled lugs of said slide members, and a pair of guide grooves located closer to opposite side edges of said back plate member than said first and second pairs of recesses for slidably receiving said pair of pawls of said hook.

12. A telephone as claimed in claim 11, further comprising a pawl formed at the lower edge of said slide surface of said main casing.

13. A telephone as claimed in claim 12, wherein said back plate member having a convex back surface which is provided with an elongated guide recess for allowing said pawl of said main casing to slide therein when said auxiliary casing slides between said extended and said contracted positions.

* * * * *